Aug. 16, 1932.  D. Q. WILKES  1,872,543
AUTOMOBILE BRAKE TESTING DEVICE
Original Filed April 15, 1927  3 Sheets-Sheet 1

Aug. 16, 1932.  D. Q. WILKES  1,872,543
AUTOMOBILE BRAKE TESTING DEVICE
Original Filed April 15, 1927  3 Sheets-Sheet 3

Inventor
Don Q. Wilkes
By H. S. Bailey, Attorney.

Patented Aug. 16, 1932

1,872,543

UNITED STATES PATENT OFFICE

DON Q. WILKES, OF PUEBLO, COLORADO, ASSIGNOR TO BENDIX COWDREY BRAKE TESTER, INC., OF SOUTH BEND, INDIANA, A CORPORATION OF DELAWARE

AUTOMOBILE BRAKE TESTING DEVICE

Application filed April 15, 1927, Serial No. 183,996. Renewed March 24, 1932.

This invention relates to automobile brake testing devices, and is designed as an improvement over an allowed application for a brake testing device for automobiles, No. 1,669,584 granted to me on May 15th, 1928.

The main object of the present invention is to provide a simple and practical device for testing the brakes of cars of any length of wheel base and of either the two-wheel or the four-wheel brake system, ability of each brake to retard the wheel being shown by an individual indicator.

Further, to provide a brake testing device, comprising two sets of grooved rollers arranged to support the four wheels of an automobile, one of said sets or rollers being mounted on an adjustable support whereby the device is adaptable for cars of different lengths of wheel base, each set of rollers comprising two axially alined idlers and two axially alined rollers which are driven by a common differential gearing, whereby a slowing down of any one of the driven rollers is permitted independently of the others, due to increased brake pressure on any one of the wheels of the car, each idle roller being connected with an independent indicator, thereby to indicate the brake resistance of each wheel.

Further, to provide a device of this character in which means are provided for preventing overload on the motor which drives the front and rear differential gearing, comprising a pair of clutches interposed in the power shaft, whereby when an overload is put upon either or both clutch driven sections of the power shaft, either or both sections will stop, while that portion of the shaft between the clutches, which is connected with the motor, will continue to rotate, thus preventing injury to the motor.

These and other objects to be hereinafter set forth are accomplished by the device illustrated in the accompanying drawings, in which:—

In practice, the improved brake testing device may be supported above the ground or floor level, and approached by an incline but it is preferably to provide the floor of a garage or other suitable place with a pit, and mount the car supporting and brake testing rollers therein, and on a level with the floor, so that a car can easily pass from the floor on to the rollers in brake testing position, the pit enabling a workman to pass back and forth beneath the car, in making necessary brake adjustments as will be understood.

Referring to the accompanying drawings:—

Figure 2:
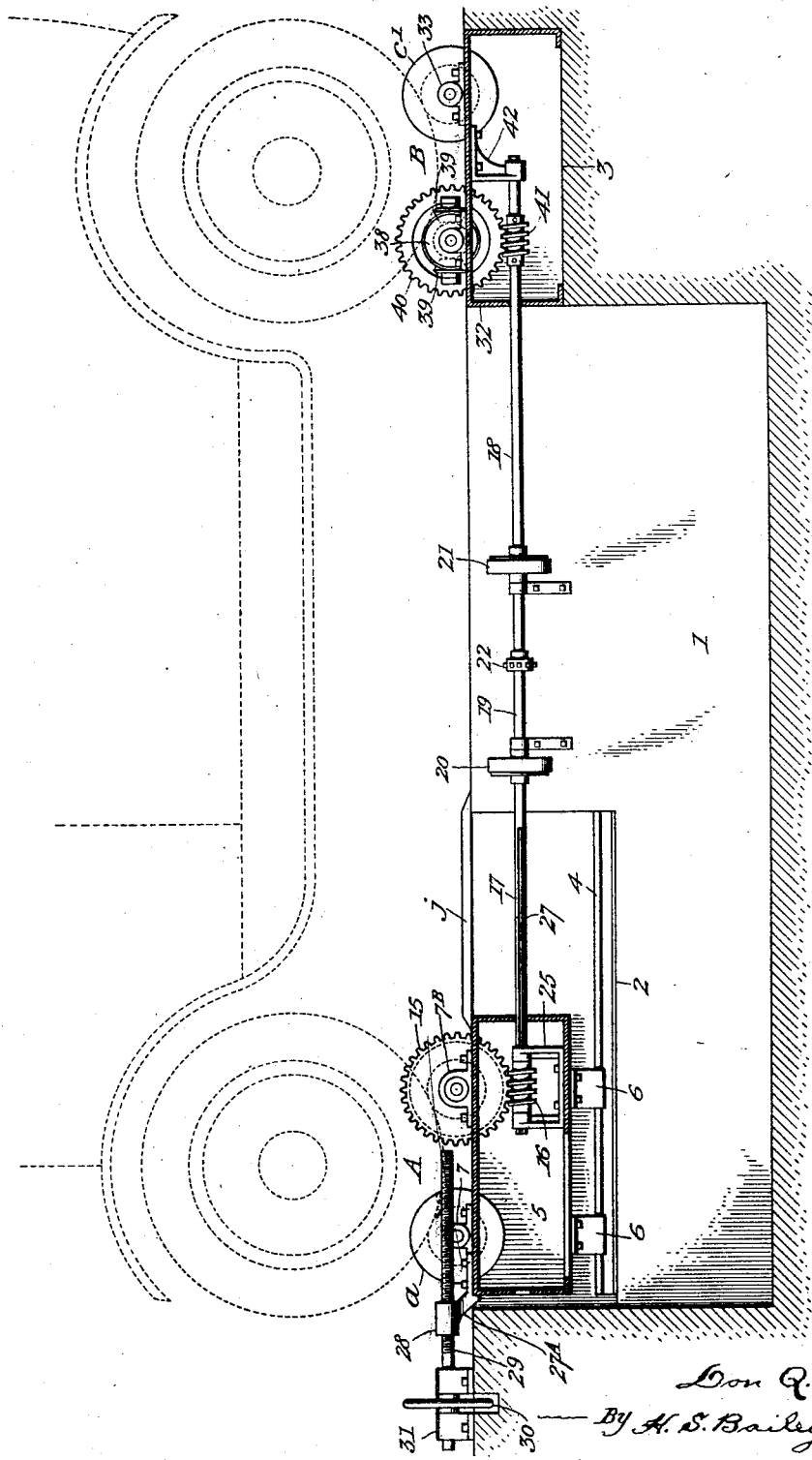
Figure 2 is a vertical, longitudinal sectional view thereof, on the line 2—2 of Figure 1.
Figure 3:
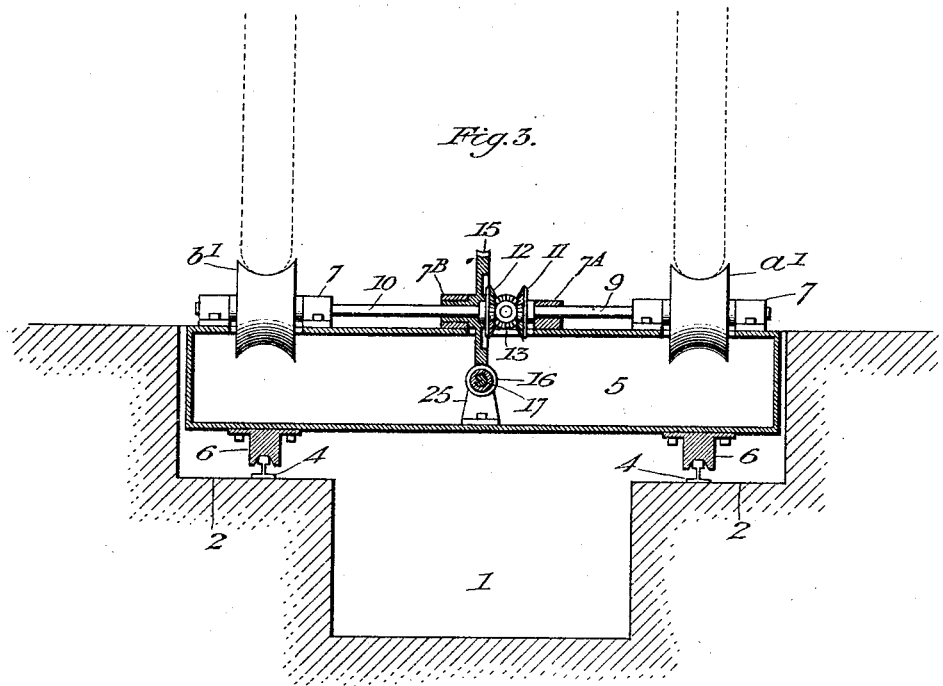
Figure 3 is a transverse sectional view on the line 3—3 of Figure 1, looking in the direction of the arrow.
Figure 4:
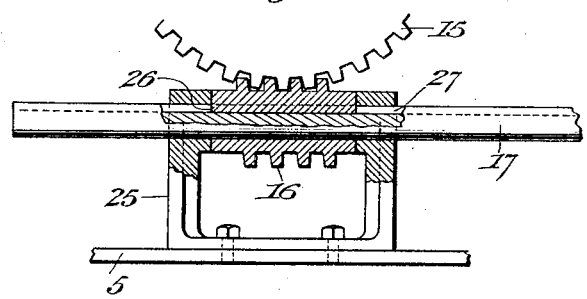
Figure 4 is an enlarged sectional view through one of the differential operating worm pinions and a portion of the drive shaft, together with the shaft bearing.

The numeral 1, indicates a pit of suitable length which at one end and on opposite sides is formed with horizontal ledges 2, which extend about half the length of the pit, the opposite end of the pit terminating in a ledge 3, which extends beyond each side of the pit a distance equal to width of the ledges 2, the ledges 2 and 3 being a suitable distance below the floor level, as shown in Fig. 2. Upon each ledge 2 is secured a rail or track 4 and upon these tracks is slidably mounted a support 5, preferably in the form of a hollow, rectangular structure, provided on its bottom side with shoes 6 which are recessed to fit upon the tracks and overlie the sides thereof, so as to prevent lateral movement of the support, but permit a back and forth sliding movement of the same upon the tracks, as will be understood by reference to Fig. 3. Upon the top of the support are mounted two pairs of grooved rollers A and B, the pair A being directly above one of the tracks and the pair B being directly above the other track and each of these rollers is supported in bearings 7 which are bolted to the top of the support, the rollers extending through openings 8 in the top of the support. The pair A comprises an idle roller $a$, and a driven roller $a^1$, and the pair B comprises an idle roller $b$, and a driven roller $b^1$. The driven rollers $a^1$ and $b^1$ which are in axial line, are rigidly secured upon the outer end portions of shafts 9 and 10 respectively, which are mounted in the bearings 7, and upon the inner ends of these shafts are rigidly secured bevel gears 11 and 12 respectively, which mesh with differential pinions 13 on a spider 14 which is supported and rotated by a worm drive gear 15. The inner end of the shaft 9 is mounted in a bearing $7^A$ on the support 5, and the inner end of the shaft 10 is mounted in the hub of the worm gear 15 which in turn is mounted in a bearing $7^B$. The worm gear 15 is operated by a worm pinion 16, which is slidably but non-rotatably mounted on a power shaft S which is made up of three sections 17, 18 and 19, the middle section being connected to the end sections 17 and 18 by friction clutches 20 and 21 respectively, and the middle section 19 is provided with a sprocket wheel 22, which is connected by a chain 23 with the shaft of an electric motor 24 which is mounted upon one side of the pit. The shaft section 17 passes loosely through a hole in the end of the support 5, and through the hub portions of a U-shaped bearing bracket 25 which is bolted to the bottom member of the said support. The worm pinion 16 is mounted on the shaft section 17 between the hubs of the bracket 25 which hold the pinion in operative relation to the worm gear 15 and the pinion is provided with a spline 26, which fits in a groove 27 in the said shaft section, as is most clearly shown in Fig. 4.

Upon the top of the support 5 and at the front side thereof is bolted a bracket $27^A$, having an internally threaded hub 28 through which passes a threaded rod 29, the outer end portion of which passes through the hub of a hand wheel 30, and is rigidly connected therewith. The hand wheel is held against lateral movement by bearing blocks 31 which engage the ends of the wheel hub and also support the outer end portion of the threaded rod. It will be seen that by turning the hand wheel, the support 5 will be moved either backward or forward, for a purpose to be hereinafter set forth.

Upon the ledge 3 at the opposite end of the pit, is mounted a rigid support 32, upon which are mounted pairs of grooved rollers C and D which are in line, respectively, with the rollers A and B, and are rotatably supported in bearing blocks 33. The pair C comprises a driven roller $c$ and an idler $c^1$, and the pair D comprises a driven roller $d$ and an idler $d^1$, and the rollers extend through openings 34 in the top of the support.

The rollers $c$ and $d$ which are in axial line, are rigidly mounted upon the outer end portions of shafts 35 and 36, respectively, which are supported in the bearing blocks 33. Upon the inner ends of these shafts are rigidly secured bevel gears 37 and 38 respectively, which mesh with differential pinions 39, which are supported and rotated by a worm gear 40, which is driven by a worm pinion 41 which is rigidly secured upon the outer end portion of the shaft section 18, which is mounted in a bearing bracket 42 bolted to the under side of the support 32.

The inner end of the shaft 36, is supported in a bearing block $7^C$ and the inner end of the shaft 35 is supported in the hub of the worm gear 40, which in turn is supported in a bearing block $7^D$.

The outer ends of the shafts of the rollers $a$, $b$, $c^1$ and $d^1$, are provided with small gears 43, which mesh with smaller gears 44 which are mounted on brackets X on the supports 5 and 32, and the gears 44 are connected respectively by flexible shafts $e$, $f$, $g$ and $h$ with suitable indicators E, F, G and H, which register the pressure applied to each of the wheel brakes.

Figure 1:
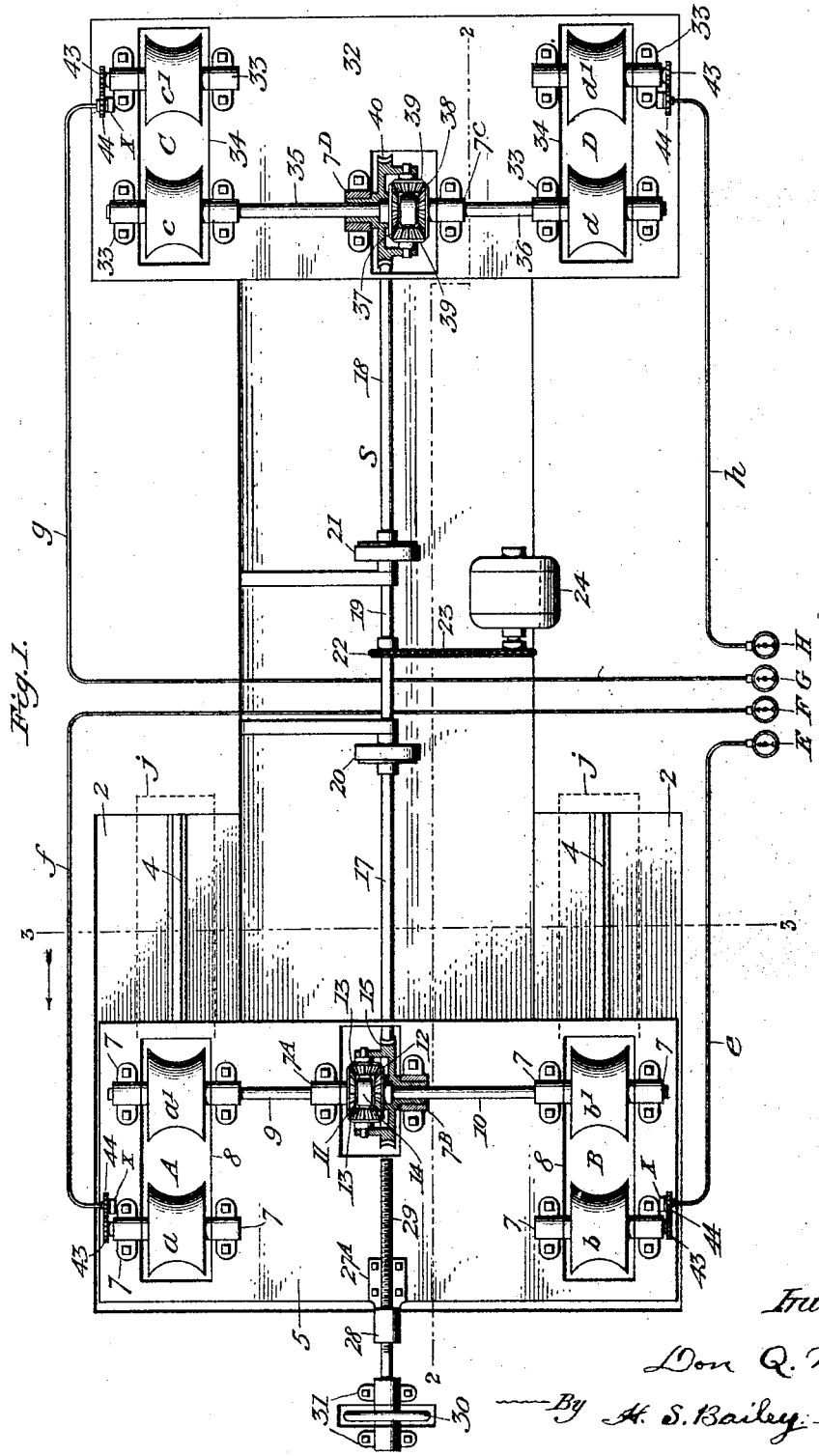
Figure 1 is a plan view of the improved brake testing device.

In order that all four wheels of a car may rest upon the supporting rollers, as in the case of a car having the four wheel brake system, it is necessary to bridge the space between the slidable support 5 and the inner ends of the ledges 2, so that a car can pass onto the rollers at one end of the pit, and thence to the rollers at the other end of the pit, and this can be done by the use of a pair of boards $j$ which rest at one end on the support 5 and at the other end walls of the ledges 2, as shown in dotted lines, Fig. 1, and in full lines Fig. 2. In practice, when it is desired to test the brakes of a car having the four-wheel brake system, the car is driven or backed onto the rollers, so that each wheel will rest partly on a driven roller and partly on an idle roller, as shown by dotted lines in Fig. 2, the slidable support 5, having previously been adjusted with respect to the fixed support 32 to suit the wheel base of the car to be tested.

Power is then applied to the rollers $a^1$—$b^1$ and $c$—$d$, through the drive shaft S and the two sets of differential gearing operated thereby, and the wheels of the automobile are thus driven simultaneously at a uniform rate of speed and this speed is transmitted to the idle rollers $a$, $b$, $c^1$ and $d^1$, each idler being thus compelled to travel at the same peripheral speed as the driven rollers. The speeds of the idlers are registered automatically on the indicators E, F, G and H, and if no influences are exerted, other than the turning force of the drive rollers, the indicators for the four car wheels will register the same speed. But when the brakes are applied to the four wheels, there is an immediate slowing down of the wheels in proportion to the effectiveness of the brakes, and this slowing down of the speed of the wheels instantly affects the idle wheels in the same manner as the automobile wheels which drive them. The rear brakes should each apply thirty percent of the entire brake pressure, and the front wheels should each apply twenty percent of the entire brake pressure, and if the brakes are not properly adjusted, any variation in this percentage will be registered by the indicators, and the brakes can then be adjusted and tested until the desired results are obtained.

If the brakes are tightly set, the resistance might seriously overload the driving electric motor, hence the clutches 20 and 21 are provided, one between the motor drive and the front differential and the other between the motor drive and the rear differential.

The clutches may be adjusted to any degree of tightness desired, and if an overload is put upon either the shaft section 17 or 18, the overload section will stop while the other section, the middle section 19, and the motor will continue to rotate; and if both sections 18 and 19 are overloaded the middle section and the motor will still continue to rotate. The differential gearing permits any one of the driven rollers $a^1$—$b^1$, $c$—$d$ to slow down under increased resistance, independently of the others, so that the exact pressure applied to each brake can be correctly ascertained, and recorded. In testing two-wheel brakes, it is only necessary to back the rear wheels of the car upon either set of testing rollers. Instead of the means shown and described for adjusting the slidable support 5, I may use any other suitable means for this purpose, such as a rack and pinion.

Having described my invention, what I claim as new and desire to secure by Letters Patent, is:—

1. In a brake testing device of the character described, the combination with a fixed support, a slidable support and differential gearing on each support including a driving gear; of a power shaft and pinions thereon in mesh with said driving gears one of said pinions being slidable but non-rotatable on said shaft, said shaft comprising three axially alined sections, a clutch connection between the adjoining ends of said sections, a power source and means connecting the middle section therewith, opposite pairs of rollers on each support, shafts connected to the inner rollers of the opposite pairs of rollers on each support and having gears on their inner ends in operative connection with the adjacent differential gears, thereby to permit a slowing down of any one shaft independently of the others, the inner roller of one pair being in axial line with the inner roller of the opposite pair on the same support, the other rollers being idlers, means for adjusting the slidable support and a speed indicator connected to each idler.

2. In a brake testing device of the character described, a fixed support, a slidable support, opposite pairs of rollers on each support, the inner roller of one pair being in axial line with the inner roller of the opposite pair on the same support, means for driving the inner rollers of the opposite pairs of rollers on each support and for permitting a slowing down of any one of the driven rollers independently of the other driven rollers, the other roller of each pair being an idler; means for adjusting the slidable support with respect to the fixed support, and a speed indicator connected to each of said idlers.

3. In a brake testing device of the character described, the combination with a fixed support, a slidable support, and means for adjusting the same with respect to the fixed support, opposite pairs of rollers on each support, the inner roller of one pair being in axial line with the inner roller of the opposite pair on the same support, and means including gearing for driving the inner rollers of the opposite pairs of rollers on each support and for permitting a slowing down of any one of the driven rollers independently of the others; of means for operating the gearing on each support comprising a power shaft, a yoke shaped bracket on the slidable support for supporting one end portion of said shaft, a pinion slidable but non-rotatable on the shaft, for operating the gearing on the slidable support, said pinion being confined between the arms of the yoke shaped bracket, a bearing on the fixed support for the opposite end of the shaft and a pinion rigidly mounted on the latter end portion of the shaft and operatively connected with the gearing on the fixed support and means for indicating the speed of each driven roller.

4. In a brake testing device of the character described, the combination with a fixed support, a support adjustable with respect to the fixed support, and means for affecting such adjustment; of opposite pairs of rollers on each support, the inner roller of one pair being in axial line with the inner roller of the opposite pair on the same support, gearing for driving the inner rollers of the opposite pairs of rollers on each support in common, and for permitting a slowing down of any one of said rollers independently of the others, the other roller of each pair being an idler, a three-section power shaft, pinions on the outer sections in driving connection with said gearing one of said pinions being slidable but non-rotatable on its section, a power source, means connecting the middle shaft section therewith, clutches connecting the adjoining ends of the outer and middle shaft sections, and a speed indicator connected with each idler.

5. In a brake testing device, the combination with supports, opposite pairs of rollers on each support, the inner roller of one pair being in axial line with the inner roller of the opposite pair on the same support, sets of differential gearing for driving a roller of each of the opposite pairs of rollers on each support, each set of differential gearing including a worm gear; of a power shaft, worm pinions thereon in mesh with said worm gears, one of said pinions being slidable but non-rotatable on said shaft, means for varying the position of one support with respect to the other, and means associated with each pair of rollers for indicating the speed of the individual automobile wheel driven thereby.

6. In a brake testing device, the combination with four sets of rollers for supporting the four wheels of an automobile, and a motor, of power transmission mechanism for driving a roller of each set from said motor, said mechanism including a differential at each end of said device for equalizing the torque applied to the two sets of rollers at the respective ends of the device, means for selectively interrupting the transmissison of power to the two sets of rollers at either end of the device, and means for indicating the speeds at which each of the four automobile wheels is driven by its respective set of rollers.

7. In a brake testing device, the combination with four sets of rollers for supporting the four wheels of an automobile, a motor, a pair of operating shafts and clutch means for connecting either shaft to said motor, a drive shaft for a roller of each set, a differential between the two drive shafts at each end of the device and the respective operating shaft associated therewith, and means associated with each set of rolllers for indicating the speed at which the automobile wheel supported thereby is driven.

In testimony whereof, I affix my signature.

DON Q. WILKES.